May 31, 1955 H. SCHAUER 2,709,720
AUTOMATIC TELEPHONE EXCHANGE ARRANGEMENT
Filed March 29, 1954
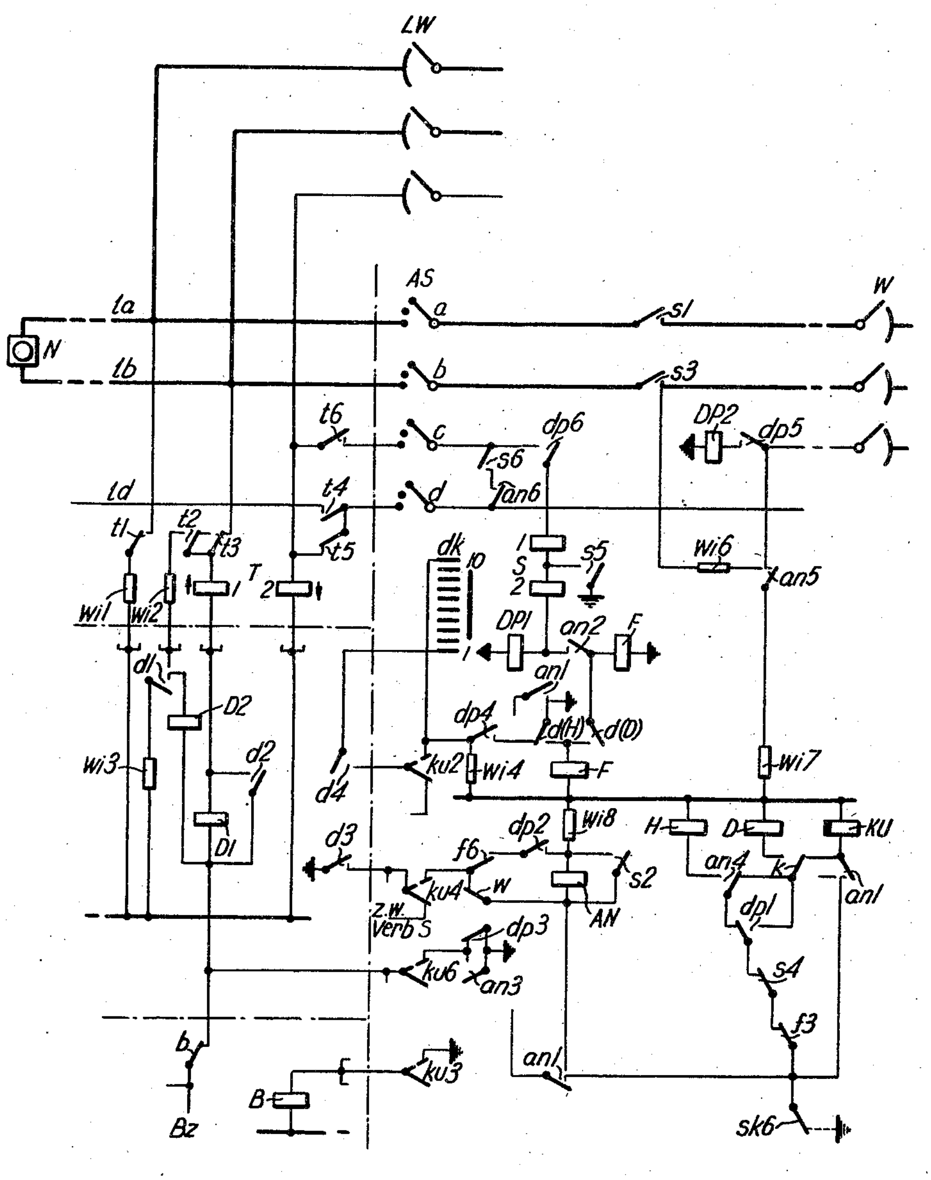
INVENTOR
Hermann SCHAUER
By [signature]
Attorney

United States Patent Office

2,709,720

Patented May 31, 1955

2,709,720

AUTOMATIC TELEPHONE EXCHANGE ARRANGEMENT

Hermann Schauer, Frankfurt am Main, Germany, assignor to Telefonbau und Normalzeit Gesellschaft mit beschränkter Haftung, Frankfurt am Main, Germany, a German joint-stock company Application March 29, 1954, Serial No. 419,479

Claims priority, application Germany April 11, 1953

7 Claims. (Cl. 179—18)

The invention relates to a circuit arrangement for an automatic telephone exchange employing call finders.

It is an object of the invention to provide such an arrangement wherein a calling subscriber's relay responds to an incoming call, is held in a holding circuit and then immediately disconnected from the calling subscriber's line so that such disconnection takes place before a call finder has found the calling subscriber's line. Thereby, the branch circuit comprising the subscriber's relay is disconnected from the calling subscriber's line at an early stage in the building up of the desired connection.

It is a further object to provide such an arrangement wherein the holding circuit is controlled by means common to a plurality of subscriber's lines.

Other objects and advantages of the invention will become apparent from the following detailed description when read in conjunction with the appended drawing which illustrates, by way of example, a circuit diagram of an arrangement of the invention.

The circuit arrangement illustrated comprises a plurality of subscribers' relays, one for each subscriber's line, a winding on each of said relays being connectable to the respective subscriber's line, means being provided for inserting the winding into a local holding circuit while a connection is being built up over the subscriber's line. Preferably, a contact is provided on each of the subscribers' relays for disconnecting the winding from the subscriber's line after the winding has been inserted into the circuit. Thereby, it may be achieved that branch circuits can be disconnected from the subscriber's line as soon as the said winding has been inserted into the holding circuit and need not be delayed until the connection between a calling subscriber's line and a called subscriber's line has been completed. The holding circuit may be controlled by switching means for ascertaining whether a call finder is free. Means may be provided for interrupting the holding circuit of the relay winding when, in response to a call, a call finder has reached the subscriber's line. The holding circuit may be controlled (or additionally controlled) by the excitation of a starting relay for the call finder, the interrupting means being arranged for short-circuiting the starting relay when the call finder has reached the calling subscriber's line. Each of the subscribers' relays may be provided with a second winding lying in a test circuit and acting in opposition to the first winding, the arrangement being such that, when the call finder has reached the calling subscriber's line, the subscriber's relay is kept excited by the second winding, the excitation caused by the second winding predominating over that caused by the first winding. Preferably, the holding circuit is controlled by additional switching means common to a plurality of subscribers' lines. The additional switching means may serve an additional purpose. For example, they may be arranged for marking the decade of the calling subscriber's line. The additional switching means may comprise a relay having a winding common to the plurality of subscribers' lines, the said winding lying in series with the first winding of the subscriber's relay, the series connection of the two windings lying in the calling circuit, which includes the calling subscriber's line. The relay of the additional switching means may comprise a second winding, the arrangement being such that, when the said relay responds, its first winding is short-circuited by the said relay whereby the intensity of the current flowing through the first winding of the subscriber's relay is increased, and a local holding circuit is closed by the relay of the additional switching means for holding the said relay by its second winding.

In the circuit diagram illustrated, to each subscriber's line N a subscriber's relay T is allocated which serves as a calling as well as a separating relay. As call finder AS, the arrangement provides a two-motion selector having a plurality of decades, the selector first finding the decade of lines comprising the calling subscriber's line and subsequently the calling subscriber's line within the decade. For setting the selector to the decade of the calling subscriber's line, a decade relay D is employed. The decade relay D also performs a secondary function in that it forms a local holding circuit for a group of ten subscribers' relays T each corresponding to one of ten subscribers' lines of the same decade. If the invention be applied to a circuit of a call finder to which a single group of subscribers' lines all belonging to the same decade is connected, then the decade relay D is omitted. In such a case another relay, for example an initiating relay, which is connected in known manner to the subscriber's line during the dialling period may be used for closing the local holding circuit for all the calling subscribers' lines.

When, at a subscriber's set N the receiver is lifted preparatory to dialling, a circuit is closed across the calling subscriber's line *1a*, *1b*. The current in this circuit flows through a resistor *Wi1*, contact *t1*, the wire *1a*, the subscriber's set N, the wire *1b*, contact *t3*, a first winding 1 of the relay T of the calling subscriber's line, a first winding D1 of a relay D, contact *ku6* and contact *dp3*. The relay D closes contact *d1* in a local holding circuit comprising an additional winding D2 of the relay D in series with a resistor *Wi3*. A relay K*u* is operated and keeps contact *ku6* closed so long as a free link is available for connecting the call finder AS to a selector W.

Contact *d2* shunts the winding D1 of relay D which nevertheless is held closed by the local holding circuit across its winding D2. The short circuit of the winding D1 of the relay D increases the intensity of the current flowing in the circuit across the subscriber's line *1a*, *1b* so as to close the relay T by means of its first winding 1. Contacts *t2* and *t3* are so arranged that contact *t2* closes before contact *t3* opens. Contact *t2* connects the first winding 1 of relay T into another local holding circuit which is controlled by contact *d1* of the relay D. Contacts *t1* and *t3* now disconnect the branch circuit comprising the first winding 1 of the relay T from the line *1a*, *1b*. Contact *t6* places a winding 2 of the relay T on to its contact of the bank of contacts for the wiper *c* of the call finder AS and thus marks the relevant contact of the calling subcsriber's line. Contact *d4* marks the decade of the calling subscriber's line (shown in the drawing as decade 1) on the decadic contact bank *dk* of the call finder AS. Contact *d3* closes a circuit for a relay AN of the connecting link between the call finnder AS and the selector W. Contact *an4* closes a circuit for a lifting magnet H of the call finder AS, and contact *an1* closes a circuit for a relay F, the circuit extending across contact *d*(H) of the lifting magnet H. The lifting magnet H and the relay F operate alternately until the decade wiper of the call finder AS is positioned on contact 1 of the decade bank *dk*, which is marked by contact *d4*. Then the relay DP is closed by means of winding DP1 and is held closed by contact $dp5$ closing a circuit for winding DP2 of the relay DP. Contact $dp1$ interrupts the stepping circuit of the lifting magnet H, and off-normal contact $k$ switches in a rotating magnet D of the call finder AS which by means of contact $d$(D) operates alternately with relay F. When the wiper $c$ of the call finder has reached the contact marked by contact $t6$ of the calling subscriber's line, a relay S is closed and disconnects the rotating magnet D of the call finder AS by means of contact $s4$. Contacts $s1$ and $s3$ connect the calling subscriber's line to the selector W which may be a first group selector or a line selector. By means of the selector W the calling subscriber selects his call by dialling. The relay S by means of its contact $s5$ locks the connection. Contact $s2$ short circuits the relay AN; contact $an1$ interrupts the circuit for the relay KU; and contact $ku4$ brings another connecting link into readiness for another call from the same decade.

Since contact $dp3$ has been operated, contact $an3$ interrupts the local holding circuits for the relays T and D so that the decade relay D returns into its initial position. Since the two windings 1 and 2 of the relay T are connected in opposition to each other, the magnetization of the relay T is momentarily zero during testing. However, the relay T is again magnetized through the contact $t5$, contact and wiper $d$ of the call finder AS, contacts $an6$, $s6$, $dp6$, winding 1 of relay S, and contact $s5$, and holds itself since the second winding 2 of the relay T predominates over the first winding 1 of the relay T, the said winding 1 lying in series with contact $t6$. The contacts of the relay T are so arranged that contact $t6$ closes before contact $t5$ opens. Thus, interruption of the call finding circuit and interference with the subscriber's connection is prevented. After the relays S and T have responded, a line $1d$ is connected across contact $t4$ to a wiper $d$ of the call finder AS and can be used for other purposes, for example for controlling a counting device, or for igniting a lamp individually allocated to the subscriber's line.

During the call, the relay DP is held by its winding 2. Release is effected by interrupting the circuit for winding DP2 of the relay DP in known manner, in the selector W. Contact $dp6$ is opened and interrupts a testing circuit so that the relay S and the relay D relapse. By means of contacts $dp1$ and $s4$, the rotating magnet D of the call finder AS is brought into its initial position and brings the wipers into their home position. Off-normal contact $k$ returns into its position of rest thereby closing a circuit for relay KU, so that contact $ku4$ brings another connecting link into readiness for use.

If all the connecting links are busy then none of the relays KU can operate. All the contacts $ku6$ are open and prevent the formation of a loop to a calling subscriber so that the relays D and T cannot respond. In such a case, the calling subscriber receives an engaged signal from circuit BZ through a contact $b$ of a relay B which closes through contact $ku3$.

If the subscriber's line is engaged across a line selector LW, the relay T is closed through its winding 2 and the subscriber's line is blocked in known manner by means not shown. Contacts $t1$ and $t3$ disconnect the branch circuits comprising the relay T from the subscriber's line $1a$, $1b$. Although contact $t2$ prepares a local holding circuit for winding 1 of the relay T, the circuit remains ineffective since, as already mentioned, the winding 2 of the relay T highly predominates over the winding 1.

On the cessation of an incoming or outgoing call, the circuit for the relay DP is, in known manner (not shown) interrupted in the connecting link and thereby the wiper $c$ of the call finder AS does not conduct current owing to the contact $dp6$ being open. When in the decade in question no local holding circuit exists for a relay T of another line of a subscriber who wants to make a call, the relay T of the subscriber whose connection is released immediately opens. If, however, in the decade in question a local holding circuit for the relay T of another subscriber's line exists, then the relay T of the subscriber whose connection is released nevertheless opens immediately since the winding 2 of the respective relay T is connected in opposition to the winding 1 of the said relay T. When the circuit of the said winding 2 is interrupted, the relay T in the holding circuit which is magnetized in the opposite sense by its winding 1, is de-energized and therefore opens. Contact $t2$ separates the connection to the local holding circuit so that the relay T cannot be re-energized. Contacts $t1$ and $t3$ in their position of rest prepare the circuit for another call.

If the receiver of the calling subscriber's set N is replaced before the dialling is completed then the subscriber's line is first switched through to the connecting link and only then is the wiper $c$ rendered free of current by the connecting link in known manner.

It should be clearly understood that the circuit diagram described hereinbefore with reference to the accompanying drawing is given by way of example only. Many modifications, omissions and additions are possible without departing from the spirit of this invention.

I claim:

1. In and for an automatic telephone exchange, an arrangement comprising a plurality of subscribers' relays, one for each subscriber's line, a first winding and a second winding on each subscriber's relay, the said windings being arranged for exciting the subscriber's relay in opposite senses and dimensioned so that the excitation of the subscriber's relay due to the second winding predominates over that due to the first winding, a first contact and a second contact on each subscriber's relay and operable thereby, at least one call finder for finding a calling subscriber's line, a plurality of wipers in said call finder, the said first winding exciting the calling subscriber's relay through the calling subscriber's line in response to an incoming call, a holding circuit for the calling subscriber's relay, the said first contact closing the said holding circuit and holding the subscriber's relay by the said holding circuit when the subscriber's relay has been excited by the said first winding, the said second contact disconnecting the calling subscriber's line from the calling subscriber's relay when held in the said holding circuit, the said second contact being arranged to operate after the said first contact has operated, a test circuit extending over one of said wipers, a test relay in said test circuit, a contact on said test relay, a further contact controlled by the calling subscriber's relay for opening the test circuit and de-energizing the said second winding, a further circuit extending over another one of said wipers and controlled by said contact of the said test relay, and another contact controlled by the said calling subscriber's relay for connecting the second winding of the calling subscriber's relay to the said further circuit.

2. In and for an automatic telephone exchange, an arrangement comprising a plurality of subscribers' relays, one for each subscriber's line, means for connecting each subscriber's relay to its subscriber's line, at least one call finder for finding a calling subscriber's line, means for exciting a calling subscriber's relay through the calling subscriber's line in response to an incoming call, a holding circuit for the calling subscriber's relay, means for closing the said holding circuit and holding the calling subscriber's relay by the said holding circuit, means for disconnecting the calling subscriber's line from the calling subscriber's relay when held in the said holding circuit, a relay common to a plurality of subscribers' lines, a plurality of windings on the said common relay, one of the said common relay windings being connected to the said plurality of subscribers' lines, another of the said common relay windings being inserted in the said holding circuit, a contact controlled by the said common relay for preparing the holding circuit, a further contact controlled by the said common relay for short-circuiting the said one common relay winding to increase the current intensity in the calling subscriber's line sufficiently to enable the calling subscriber's relay to respond, and means for opening the said holding circuit when the said call finder has found the calling subscriber's line.

3. In and for an automatic telephone exchange, an arrangement comprising a plurality of subscribers' relays, one for each subscriber's line, a winding on each subscriber's relay, a first contact and a second contact on each subscriber's relay and operable thereby, at least one call finder for finding a calling subscriber's line, the said winding exciting the calling subscriber's relay through the calling subscriber's line in response to an incoming call, a holding circuit for the calling subscriber's relay, the said first contact closing the said holding circuit and holding the subscriber's relay by the said holding circuit when the subscriber's relay has been excited, the said second contact disconnecting the calling subscriber's line from the calling subscriber's relay when held in the said holding circuit, the said second contact being arranged to operate after the said first contact has operated, a relay common to a plurality of subscriber's lines, a plurality of windings on the said common relay, one of the said common relay windings being connected to the said plurality of subscribers' lines, another of the said common relay windings being inserted in the said holding circuit, a contact controlled by the said common relay for preparing the holding circuit, a further contact controlled by the said common relay for short-circuiting the said one common relay winding to increase the current intensity in the calling subscriber's line sufficiently to enable the calling subscriber's relay to respond, and means for opening the said holding circuit when the said call finder has found the calling subscriber's line.

4. An arrangement as claimed in claim 3, and comprising means for testing whether the call finder is free, the said testing means controlling the said holding circuit.

5. In and for an automatic telephone exchange, an arrangement comprising a plurality of subscribers' relays, one for each subscriber's line, a first winding and a second winding on each subscriber's relay, the said windings being arranged for exciting the subscriber's relay in opposite senses, a first contact and a second contact on each subscriber's relay and operable thereby, at least one call finder for finding a calling subscriber's line, the said first winding exciting the calling subscriber's relay through the calling subscriber's line in response to an incoming call, a holding circuit for the calling subscriber's relay, the said first contact closing the said holding circuit and holding the subscriber's relay by the said holding circuit when the subscriber's relay has been excited by the said first winding, the said second contact disconnecting the calling subscriber's line from the calling subscriber's relay when held in the said holding circuit, the said second contact being arranged to operate after the said first contact has operated, a relay common to a plurality of subscribers' lines and connected thereto so as to be excited in response to an incoming call over any of the said plurality of subscribers' lines, a contact controlled by the said common relay for preparing the holding circuit, a further contact controlled by the said common relay for short-circuiting the said one common relay winding to increase the current intensity in the calling subscriber's line sufficiently to enable the calling subscriber's relay to respond, and means for energizing the other common relay winding when the call finder has found the calling subscriber's line.

6. In and for an automatic telephone exchange, an arrangement comprising a plurality of subscribers' relays, one for each subscriber's line, a first winding and a second winding on each subscriber's relay, the said windings being arranged for exciting the subscriber's relay in opposite senses and dimensioned so that the excitation of the subscriber's relay due to the second winding predominates over that due to the first winding, a first contact and a second contact on each subscriber's relay and operable thereby, at least one call finder for finding a calling subscriber's line, a plurality of wipers in said call finder, the said first winding exciting the calling subscriber's relay through the calling subscriber's line in response to an incoming call, a holding circuit for the calling subscriber's relay, the said first contact closing the said holding circuit and holding the subscriber's relay by the said holding circuit when the subscriber's relay has been excited by the said first winding, the said second contact, disconnecting the calling subscriber's line from the calling subscriber's relay when held in the said holding circuit, the said second contact being arranged to operate after the said first contact has operated, a relay common to a plurality of subscribers' lines, a plurality of windings on the said common relay, one of the said common relay windings being connected to the said plurality of subscribers' lines, another of the said common relay windings being inserted in the said holding circuit, a contact controlled by the said common relay for preparing the holding circuit, a further contact controlled by the said common relay for short-circuiting the said one common relay winding to increase the current intensity in the calling subscriber's line sufficiently to enable the calling subscriber's relay to respond, a test circuit extending over one of said wipers, a test relay in said test circuit, a contact on said test relay, a further contact controlled by the calling subscriber's relay for opening the test circuit and de-energizing the said second winding, a further circuit extending over another one of said wipers and controlled by said contact of the said test relay, and another contact controlled by the said calling subscriber's relay for connecting the second winding of the calling subscriber's relay to the said further circuit.

7. An arrangement as claimed in claim 6 and comprising means for testing whether the call finder is free, the said testing means controlling the said holding circuit.

References Cited in the file of this patent

UNITED STATES PATENTS

| | | |
|---|---|---|
| 2,199,534 | Bakker | May 7, 1940 |
| 2,552,773 | Ffolliott | May 15, 1951 |